Patented Mar. 9, 1948

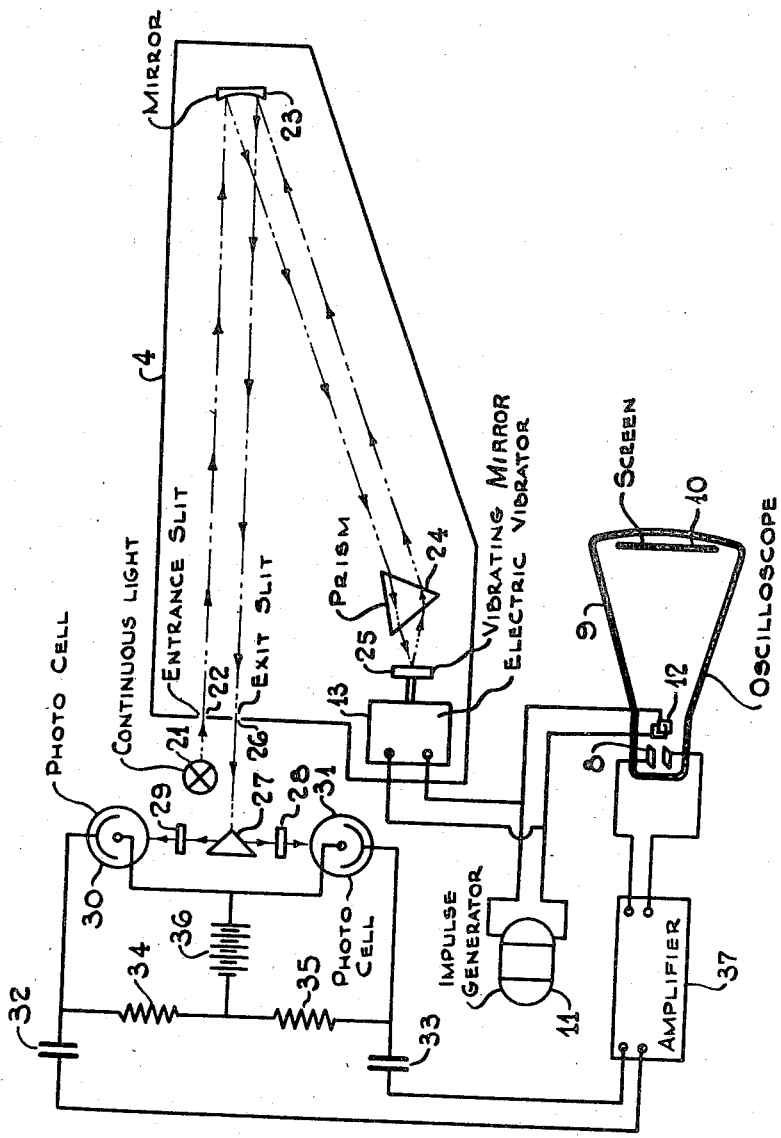

2,437,323

UNITED STATES PATENT OFFICE 2,437,323

APPARATUS FOR INSTANTANEOUSLY INDICATING ON AN OSCILLOSCOPE SCREEN THE ABSORPTION SPECTRUM OF A SUBSTANCE

John J. Heigl, Cranford, and James A. Wilson, Linden, N. J., assignors to Standard Oil Development Company, a corporation of Delaware Application May 26, 1944, Serial No. 537,416

2 Claims. (Cl. 88—14)

This invention relates to apparatus for automatically indicating spectra of substances, and more particularly relates to an apparatus for instantaneously indicating adsorption spectra on an oscilloscope screen.

It is well known in spectrometric operations to scan a spectrum over the exit slit of a monochromator and convert the scanned radiation into electrical energy by means of a photoelectric cell or similar pick-up. The change in voltages obtained from the photo-cell or other pickup is usually recorded either by means of meters or by a recording volt-meter in which a pen is electrically energized to produce a mark or curve on a continuously moving paper.

Another useful means of recording the energy changes from the photo-cell or other pick-up is to focus a beam of light as a function of the electrical impulses from the photo-cell on moving photographic paper. When using the photographic method there is quite a time lag between the exposure of the plate to the light and its subsequent development, while the use of a recording volt-meter requires cumbersome and complicated apparatus and consideration must be given to overcoming the inertia of the pen. The use of a simple meter for recording this spectrum is of course disadvantageous in that no permanent record is made and also because no immediate indication is given of the shape or slope of a spectral curve of an unknown sample.

In some cases where permanent records are not necessary it is still desirable to indicate in an instantaneous manner the form of the spectral distribution curve.

It is therefore the main object of the present invention to provide an indicating device which is simple, instantaneous and relatively cheap.

In accordance with the present invention, substantially monochromatic light is produced which is continuously varied in wave length over the portion of the spectrum in which it is desired to examine a particular substance, thus it may be desired to determine the absorption characteristics of a substance in the ultra-violet range of the spectrum or the visible range of the spectrum or the infra-red range of the spectrum. Means are therefore used to continuously vary the wave length of the radiant energy over the particular range desired.

This radiant energy of continuously varying wave length is then split into two beams. One beam is passed through the substance under examination and impinges on a photocell. The other beam impinges directly on another photocell having the same characteristics as the first photocell. By connecting these photocells in opposition an instantaneous voltage will be developed proportional to the absorption of the substance for the wave length of radiant energy impinging on the photocells at a given instant. By suitably impressing the resultant voltage of the photocells on an oscilloscope, together with a suitable sweep voltage, a graph-like trace will be made on the oscilloscope showing directly the absorption spectrum of the substance.

Other objects and a fuller understanding of this invention may be had by referring to the following description and claims taken in conjunction with the accompanying drawing in which a general diagram of the apparatus setup used for indicating absorption spectra is shown.

Referring now to the drawing, an illustration is given of the apparatus using an oscilloscope for indicating the absorption spectra of substances. Light from source 21 is passed through entrance slit 22 into monochromator 4 onto mirror 23 from which it is reflected through prism 24 onto vibrating mirror 25, back through prism 24 and mirror 23 and out through exit slit 26. From exit slit 26 the light is impinged on reflecting prism 27 which divides the light into two beams, one of which passes through absorption cell 28 containing a sample of the compound whose spectrum is to be determined, and the other through a standard cell 29 which may either be empty or contain a standard fluid. Light from absorption cell 28 is impinged on photocell 31 and that from absorption cell 29 on photocell 30. Photocells 30 and 31 are connected in opposition, the difference between the voltages output of these cells being applied to the amplifier 37. The output of amplifier 37 is applied to the vertical deflection plates 8 of the oscilloscope. Voltages developed by the impulse generator 11 are applied to the horizontal deflection plates 12 of this oscilloscope. It will be noted that impulse generator 11 also controls the electric vibrator 13 which changes the position of the mirror 25, the position of which determines the wave length of the light transmitted through the exit slit 26. Therefore, the position of the stream of electrons impinging on screen 10 of the oscilloscope will be controlled to produce a graph-like trace showing the absorption characteristics of the sample. In order to prevent any D. C. levels from affecting the amplifier, condensers 32 and 33 are placed in the leads from the cathodes of tubes 30 and 31, respectively. Load resistors 34 and 35 are shunted across the two cathode leads between the condensers and the cathodes of the tubes. A battery 36 connects the load resistors with the anode circuit.

By the arrangement thus described, the spectral responses of the photo-tubes are cancelled out so that the resultant A. C. output from amplifier 37 represents the true absorption of the sample. This result is made possible by the transient nature of the impulses from the photo-tubes due to the oscillations of the spectrum across the exit slit of the monochromator as a result of the vibration of mirror 25.

Instead of using a clear cell as the standard, a cell containing a material having a known spectrum can be used in which case the resultant output from the amplifier 37 represents the difference between the absorption spectra of the unknown and the standard samples.

From the above description, it is evident that a simple, convenient and rapid method and apparatus for indicating the absorption spectra of substances has been described. The device finds utility in the inspection of color items to determine whether color specifications have been met. It also finds utility in colorimetric titration or in the study of other reactions where it is desired to study color changing with time. Another useful field for the present invention is in the study of the absorption characteristics of materials for qualitative and quantitative analyses in the ultraviolet and visible regions. The device also finds utility in the infra-red region.

Although the present invention has been described with a certain degree of particularity, it is to be understood that the present disclosure has been made only by way of example and that numerous changes in the details of construction and the combination and arrangement of parts may be resorted to without departing from the spirit and scope of the invention as hereinafter claimed. For example, instead of vibrating the mirror it may be rotated rapidly in synchronization with the horizontal scanning in the oscilloscope. It is also within the scope of the present invention to vibrate or rotate the prism instead of the mirror. Likewise any other means for rapidly scanning the spectrum across the exit slit of the monochromator in synchronization with the horizontal scanning in oscilloscope 9 may be used.

The nature and objects of the present invention having thus been set forth and specific embodiments of the same illustrated, what is claimed as new and useful and desired to be protected by Letters Patent is:

1. In a spectrometer the combination comprising a monochromator having an exit slit, means for producing a spectrum in said monochromator, means for scanning said spectrum over the exit slit to produce a substantially monochromatic beam of energy of continuously varying wave length, means for dividing said beam into two paths, a photocell positioned in each of said paths, means to connect said photocells in opposition to produce a single resultant voltage, sample supporting means positioned before one of said photocells adapted to hold a sample in the corresponding path, standard supporting means positioned before the other of said photocells adapted to hold a standard in the corresponding path, an oscilloscope, means for producing horizontal and vertical scanning in said oscilloscope, means for synchronizing the spectrum scanning means in said monochromator with the horizontal scanning means in said oscilloscope, means for amplifying said resultant voltage, and circuit means for conducting said amplified resultant voltage to the vertical scanning means of the oscilloscope.

2. An apparatus for instantaneously indicating the absorption spectrum of a substance comprising a source of radiant energy, a prism positioned in the path of said radiant energy to produce a spectrum, a vibrating mirror positioned to reflect the spectrum produced by the prism back through the prism, a monochromatic slit positioned in the path of the reflected spectrum, means for vibrating said mirror in a direction to complete the reflected spectrum to scan said slit and thereby project through said slit substantially monochromatic energy of continuously varying wave length, means for splitting this monochromatic energy into two paths, the sample holding means positioned in one of said paths, a standard supported means positioned in the other of said paths, an oscilloscope having two pairs of deflection plates at right angles to each other, a photocell positioned in each of said paths of monochromatic energy for producing an instantaneous voltage proportional to the monochromatic energy impinging thereon, means to connect said photocells in opposition to produce a single resultant voltage, circuit means for conducting said resultant voltage to one of said pairs of deflection plates to cause deflection of the electron stream of the oscilloscope in one direction and means for synchronizing the vibrating mirror in the monochromator with the other pair of deflection plates in said oscilloscope to cause deflection of the electron stream of the oscilloscope at right angles to the deflection produced by the first pair of deflection plates.

JOHN J. HEIGL.
JAMES A. WILSON.

REFERENCES CITED

The following references are of record in the file of this patent:

UNITED STATES PATENTS

| Number | Name | Date |
| --- | --- | --- |
| 1,450,061 | Coblentz | Mar. 27, 1923 |
| 1,964,365 | Razek et al. | June 26, 1934 |
| 2,064,517 | Brice | Dec. 15, 1936 |
| 2,193,606 | Ulrey | Mar. 12, 1940 |